United States Patent
Farley et al.

(10) Patent No.: US 7,749,054 B2
(45) Date of Patent: Jul. 6, 2010

(54) MODULAR SEPARATOR ELEMENT FOR A THRESHING SYSTEM

(75) Inventors: Herbert M. Farley, Elizabethtown, PA (US); Wayne Flickinger, New Providence, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/006,337

(22) Filed: Jan. 2, 2008

(65) Prior Publication Data

US 2008/0167101 A1  Jul. 10, 2008

Related U.S. Application Data

(60) Provisional application No. 60/878,823, filed on Jan. 5, 2007, provisional application No. 60/878,817, filed on Jan. 5, 2007.

(51) Int. Cl.
A01F 12/34 (2006.01)
(52) U.S. Cl. ...................................................... 460/71
(58) Field of Classification Search .................. 460/71, 460/72, 112, 68, 66, 69
See application file for complete search history.

(56) References Cited

U.S. PATENT DOCUMENTS

| | | | |
|---|---|---|---|
| D32,067 S | 1/1900 | Huber | |
| 3,083,922 A | 4/1963 | Enright et al. | 241/260 |
| 4,338,954 A | 7/1982 | Kirst et al. | 130/27 G |
| 4,946,419 A * | 8/1990 | Cromheecke et al. | 460/68 |
| 5,035,675 A | 7/1991 | Dunn et al. | 460/62 |
| 5,125,871 A * | 6/1992 | Gorden | 460/69 |
| 5,152,717 A | 10/1992 | Nelson et al. | 460/122 |
| 5,192,245 A | 3/1993 | Francis et al. | 460/71 |
| 5,192,246 A | 3/1993 | Francis et al. | 460/72 |
| 5,376,047 A | 12/1994 | Harden et al. | 460/121 |
| 5,454,758 A * | 10/1995 | Tophinke et al. | 460/68 |
| 5,556,337 A | 9/1996 | Tophinke et al. | 460/70 |
| 5,919,086 A * | 7/1999 | Derry | 460/72 |
| 6,036,598 A | 3/2000 | Harden et al. | 460/66 |
| 6,083,102 A | 7/2000 | Pfeiffer et al. | 460/68 |
| 6,190,252 B1 * | 2/2001 | Makeeff | 460/69 |
| 6,264,553 B1 | 7/2001 | Neumann et al. | 460/71 |
| 6,325,714 B1 | 12/2001 | Tanis et al. | 460/71 |
| 6,375,564 B1 | 4/2002 | Armann et al. | 460/66 |
| 6,442,916 B1 * | 9/2002 | Pope | 56/10.2 R |
| 6,494,782 B1 * | 12/2002 | Strong et al. | 460/71 |
| 7,390,252 B1 * | 6/2008 | Tanis et al. | 460/68 |
| 2005/0020330 A1 | 1/2005 | Mackin et al. | 460/71 |
| 2005/0026663 A1 * | 2/2005 | Grywacheski et al. | 460/68 |
| 2005/0096108 A1 * | 5/2005 | Quekelberghe et al. | 460/66 |

(Continued)

FOREIGN PATENT DOCUMENTS

JP     5253503     10/1993

*Primary Examiner*—Ápád Fábián-Kovács
(74) *Attorney, Agent, or Firm*—Michael G. Harms; John William Stader; Patrick M. Sheldrake (57) ABSTRACT

A modular straight separator bar for a rotor for a threshing system of an agricultural combine that is mountable on a single mounting lug and interchangeable with a rasp bar at a plurality of locations on the rotor. As a result, more straight separator bars may be mounted towards the front of the rotor providing the threshing system the capability of performing increased separation in the threshing process without interrupting the helical flow pattern of the crop material.

12 Claims, 7 Drawing Sheets

U.S. PATENT DOCUMENTS

2006/0025186 A1* 2/2006 Quekelberghe et al. ....... 460/66
2007/0026913 A1* 2/2007 Kuchar ...................... 460/112
2007/0049366 A1* 3/2007 Pope ........................... 460/68

* cited by examiner

PRIOR ART

MODULAR SEPARATOR ELEMENT FOR A THRESHING SYSTEM

This application claims the benefit of U.S. Provisional Application Nos. 60/878,823 and 60/878,817, both filed Jan. 5, 2007.

TECHNICAL FIELD

This invention relates generally to threshing/separating elements, such as straight separator bars and rasp bars, mounted on a rotor for the threshing system of an agricultural combine, and more specifically to a modular straight separator bar mountable on a single mounting lug and interchangeable with a rasp bar at desired positions on the rotor, which separator bar allows separation capability without substantially altering the flow characteristics of the crop material about the rotor.

BACKGROUND ART

U.S. Provisional Application Nos. 60/878,823 and 60/878,817, both filed Jan. 5, 2007, are incorporated herein in their entirety by reference.

Many agricultural combines use a rotary threshing and/or separating system. The system typically includes at least one rotor drivingly rotated about a rotational axis within a rotor housing, the housing having a lower region including a perforated concave spaced radially outwardly of the rotor. The rotor will often have a frusto-conical inlet end having a helical flight or flights therearound for conveying a flow of crop material into the space between the rotor and the housing. The main body of the rotor will typically have an array or layout of threshing elements, including rasp bars and separating elements, particularly straight separator bars, which protrude radially outwardly therefrom into the space. The rasp bars and separator bars are configured differently, so as to perform different functions. The functions of the rasp bars include to cooperate with one or more vanes and guides typically disposed around the upper portion of the inner circumference of the rotor housing, for conveying a mat of the crop material along a generally helical path through the space, while cooperating with the vane or vanes and/or guides, and other aspects of the concave, e.g., bars, perforations and the like of the concave, to break up larger components of the crop material into its constituents, namely larger constituents or elements of crop residue commonly referred to as straw, which includes stalks, stems, cobs and the like, and smaller constituents which comprise the grain and smaller elements of material other than grain (MOG), in the well known manner.

To perform their function, rasp bars can be defined as including a plurality of serrations defining grooves therebetween, which are oriented at small acute angles to, or generally aligned with, the direction of rotation of the rotor. Straight bars, in contrast, perform more of a separating function, that is, they operate to separate the straw and smaller grain and MOG. To perform this function, straight separator bars generally include one or more bars extending perpendicular to the direction of rotation, and include a sharp edge or edges which also extend in that direction.

To aid in understanding the difference between rasp bars and straight separator bars during rotation of a rotor, the serrations of the rasp bars can be visualized as moving with and through the crop mat at no more than a small angle to a helical direction of flow thereof, in essentially a raking or threshing action, whereas the straight separator bars essentially plow the larger straw constituents of the crop mat, to carry them away from the smaller grain and MOG. The straight separator bars are also longer than the rasp bars in the axial direction of the rotor. Additionally, on the known rotor constructions, the longer straight separator bars are located nearer to the discharge end of the rotor, as opposed to nearer to the inlet end.

To facilitate the movement of the crop mat along a generally helically path along the rotor, it is known to mount the threshing and separating elements in a spaced helical pattern about the rotor. The threshing and separating elements are typically supported on brackets or mounting lugs that are welded or otherwise mounted to the outer surface of the main body of the rotor. Rasp bars are typically mounted individually on the mounting lugs, whereas known straight separator bars, as a result of their greater axial extent, require attachment to an axially spaced apart pair of adjacent mounting lugs. As a result, straight separator bars mounted across a pair of mounting lugs have been found to interrupt the helical flow of the crop mat around the rotor. In addition, because the mounting of these straight separator bars requires pairs of mounting lugs positioned and oriented in special relation one to the other, the locations of these lugs must be determined during construction of the rotor, resulting in limitations in options for placement, and number of straight separator bars, that can be used. In adverse conditions and with increased combine capacity, however, it is often desirable to increase separation capabilities without limitations.

As combines have started to utilize smaller diameter rotors within the housing (sometimes referred to as "small tube" technology), the increased space between the outer surface of the threshing and separating elements and the housing allow for a thicker crop mat. It has been noted, however, that operation with a thicker crop mat creates increased loading conditions on the axially longer straight separator bar type separating elements. The loading conditions generated by the interaction of the thicker crop mat with the outer surface of the axially longer straight separator bar, can increase stress at the separator bar attachment point on the mounting lug, which may result in increased maintenance requirements and/or degraded threshing performance.

Accordingly, what is sought is a straight separator bar for a threshing system of an agricultural combine which overcomes at least one of the problems, shortcomings or disadvantages set forth above.

SUMMARY OF THE INVENTION

What is disclosed is straight separator bar for a threshing system of an agricultural combine which overcomes at least one of the problems, shortcomings or disadvantages set forth above.

According to a preferred aspect of the invention, a rotor for a threshing system of an agricultural combine is supported for rotation in a direction of rotation about a rotational axis therethrough. A plurality of mounting lugs is fixed to an outer circumferential surface of the rotor. The mounting lugs are arranged in a spaced apart generally helical pattern defining a generally helical direction for movement of a mat of crop material therealong. Rasp bars are mounted individually on the lugs, each rasp bar having a radially outer surface including grooves extending in directions generally aligned with, or at a small angle to, the direction of rotation. Rasp bars perform a threshing function on the mat and encourage movement of the crop material in the helical direction. Straight separator bars, configured to be individually mounted on selected ones of the mounting lugs and interchangeably mountable with the rasp bars, allow for interspersing the separator bars with the rasp bars in the helical pattern. Each separator bar includes at least one radially outer edge extending generally transverse to the direction of rotation for engaging the mat and uncoupling smaller components from the mat of crop material. Because the separator bar has an axial extent similar to an axial extent of the rasp bar, movement of the mat of crop material in the generally helical direction is maintained.

According to a preferred embodiment of the invention, the straight separator bar is configured to be mounted on a single mounting lug on the rotor and includes a sloped leading edge adjacent an agitation element. During a separating function the mat of crop material is engaged at a first end of the leading edge of the straight separator bar, guided therealong towards a radially outward second end near the agitation element. The agitation element is configured to include at least one generally rectangular portion having at least one sharp edge. Additionally, the agitation element can include multiple generally rectangular portions of differing heights.

As an advantage of the invention, the quantity and placement of straight separator bars is not necessarily predetermined during construction of the rotor. Since straight separator bars are mountable on a single mounting lug, they are interchangeable with the rasp bars, and separating capability can be achieved earlier in the threshing process if desired. In addition, separating capability can occur at multiple locations along the rotor without interrupting the generally helical flow pattern of the crop material.

DETAILED DESCRIPTION OF THE INVENTION

Figure 1:
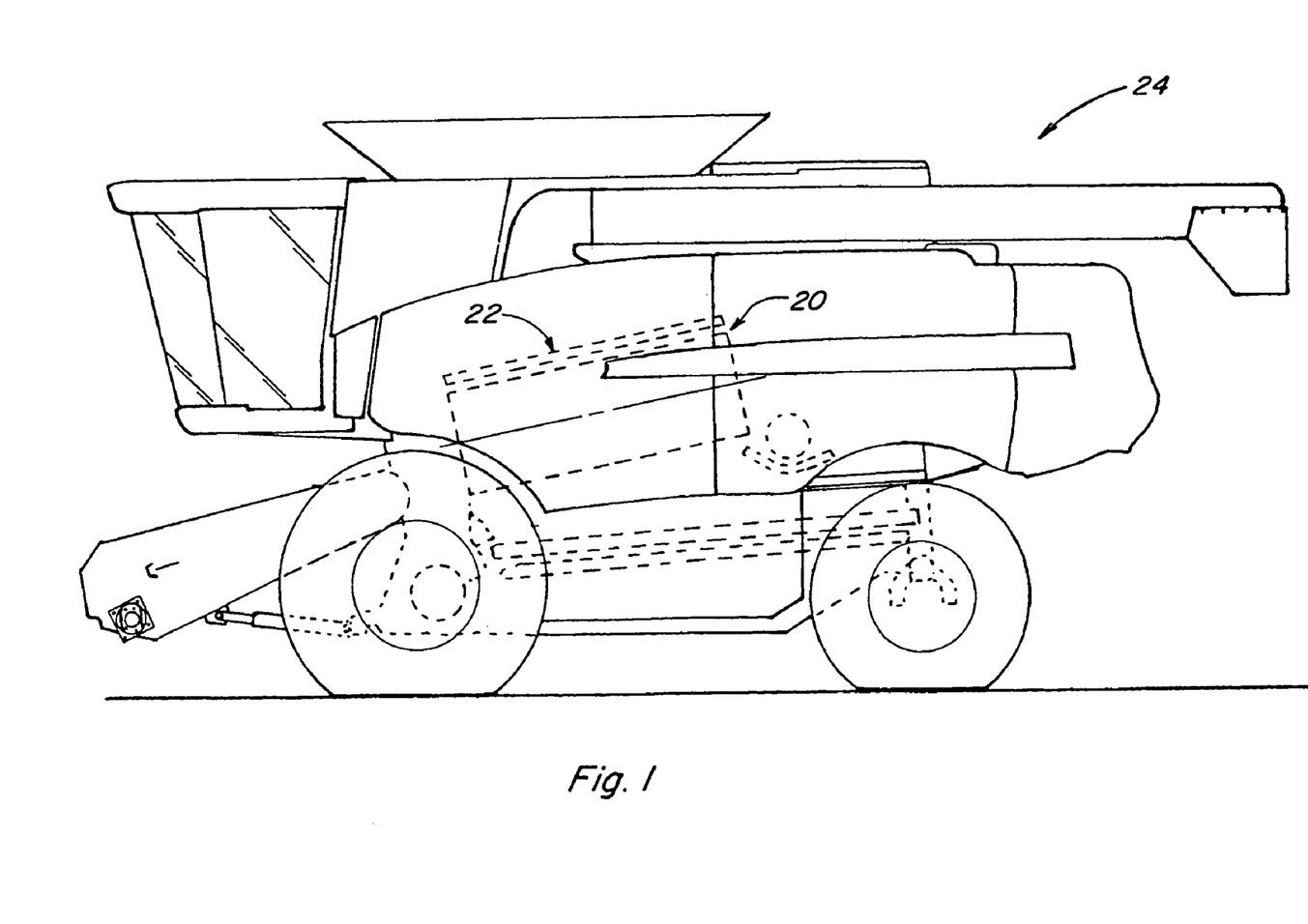
FIG. 1 is a side view of an agricultural combine having a threshing system including a rotor.
Figure 2:
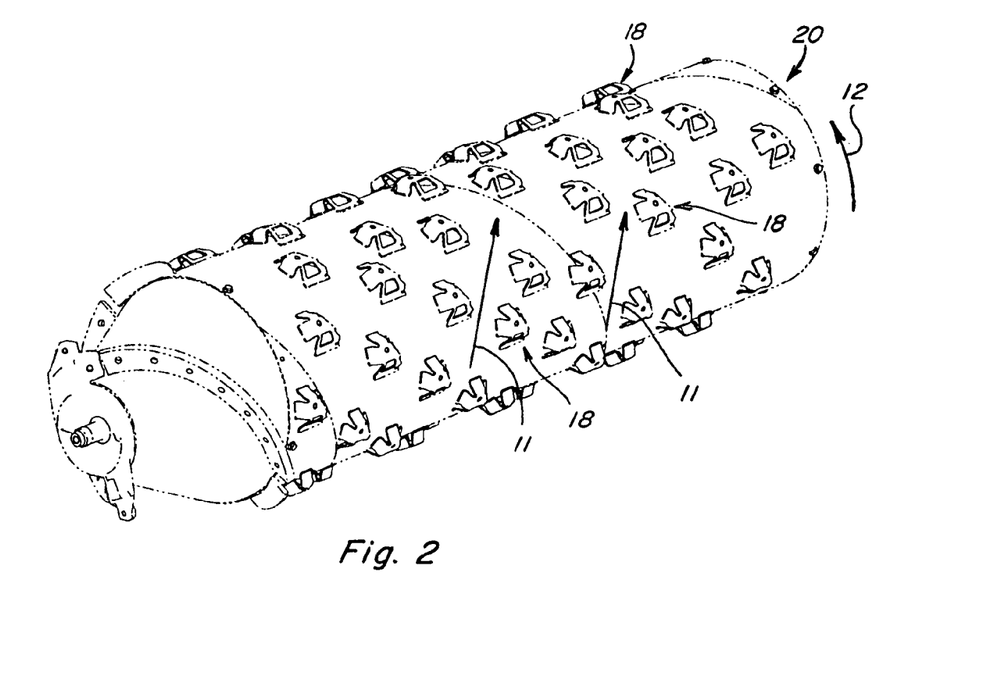
FIG. 2 is a perspective view of a representative rotor having a generally helical pattern of mounting lugs affixed to the surface of the rotor.
Figure 3:
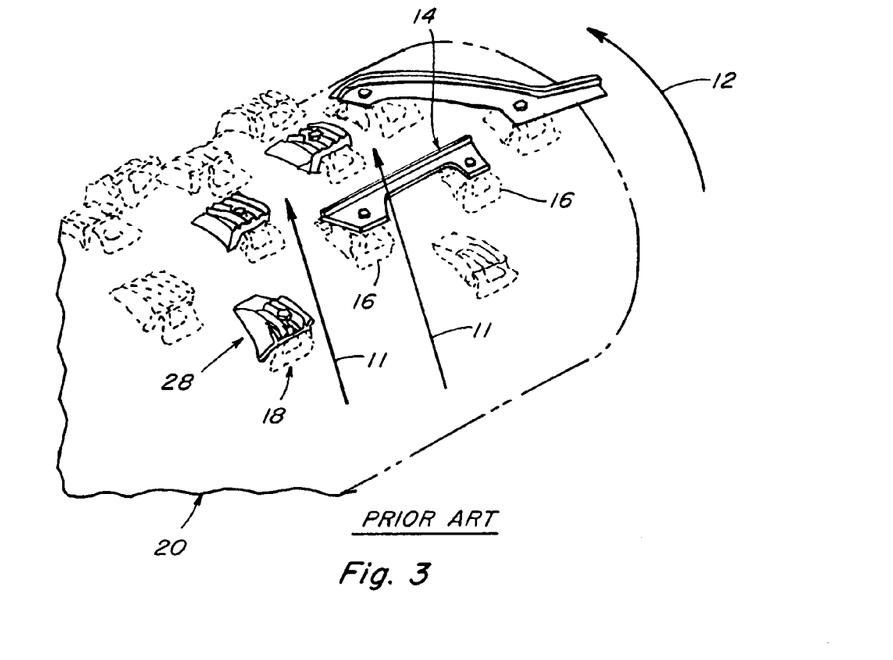
FIG. 3 is a partial perspective view of a representative prior art rotor including rasp bars mounted on a single mounting lug and a prior art separator bar mounted on a pair of adjacent mounting lugs.

Turning now to the drawings, FIG. 1 depicts a representative agricultural combine 24 including a threshing/separating system 22 that includes a rotor 20 supported therein on an axis for rotation in a direction of rotation. Agricultural combine 24 is representative of an axial flow type combine including one or two fore and aft extending rotors, but it should be understood that it is contemplated that the invention can likewise be used with rotors of other types of combines, including, but not limited to, conventional types wherein one or more rotors of the invention will be mounted in a transverse orientation within a body of the combine. FIG. 2 shows a typical spaced apart generally helical pattern of mounting lugs 18 affixed to a circumferential surface of rotor 20. This helical pattern of mounting lugs 18 cooperates within threshing/separating system 22 for movement of a mat of crop material in a generally helical direction as depicted by arrows 11 as rotor 20 rotates in a direction of rotation depicted by arrow 12. The enlarged section of rotor 20 of FIG. 3, depicts a typical prior art mounting arrangement for threshing elements, namely rasp bars 28, and separating elements, namely straight separator bar 14. Rasp bar 28 has an axial span that permits mounting on single mounting lug 18, while typical prior art straight separator bar 14 has an axial span that requires mounting on a pair of adjacent mounting lugs 16. Therefore placement of prior art straight separator bar 14 is limited to predetermined positions having pairs of adjacent mounting lugs 16 on rotor 20. Additionally because straight separator bar 14 spans two adjacent mounting lugs 16, the helical pattern of mounting lugs 18 is interrupted, and thus the movement of the mat of crop material in helical direction 11 is interrupted by prior art straight separator bar 14 as shown in FIG. 3.

Figure 4:
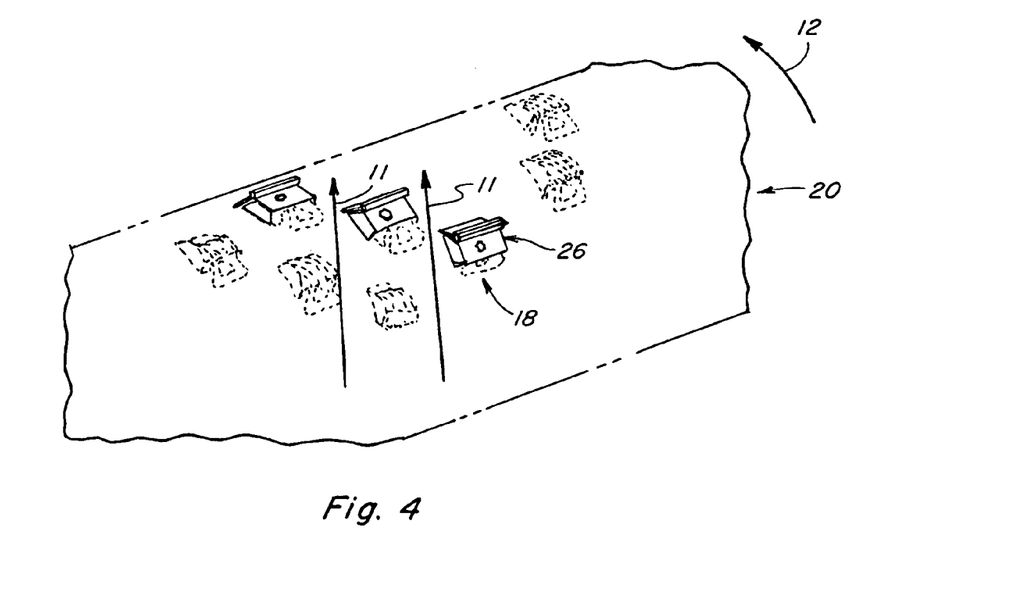
FIG. 4 is a partial perspective view of a rotor including separator bars mounted on single mounting lugs according to the present invention.
Figure 5:
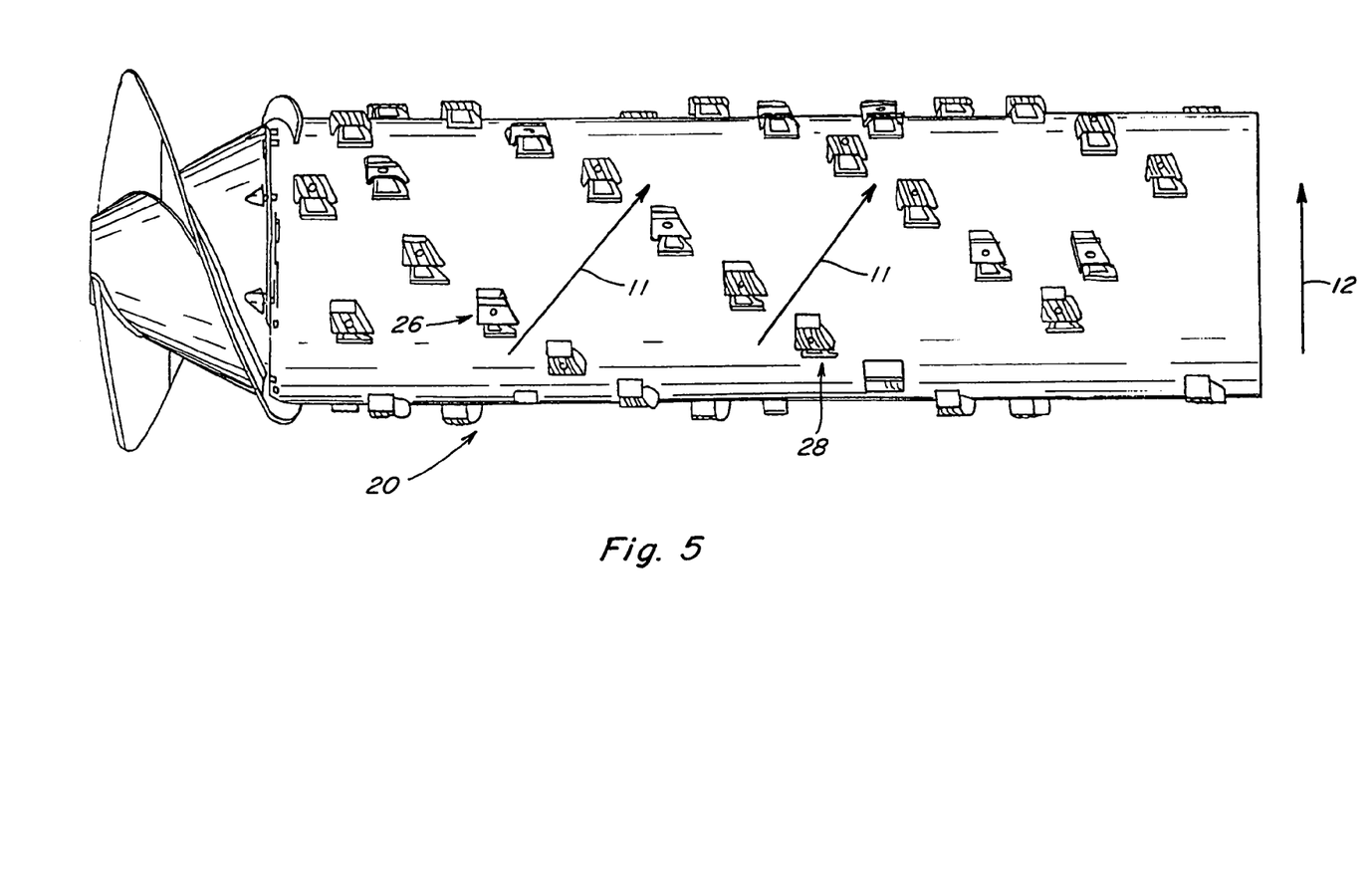
FIG. 5 is a rotor including straight separator bars interspersed with rasp bars according to the present invention.

Referring now to FIG. 4 wherein straight separator bars 26, according to the present invention, are shown mounted on individual mounting lugs 18 on the circumferential surface of rotor 20. Straight separator bar 26 is configured to be individually mounted on selected ones of mounting lugs 18 and interchangeably mountable with rasp bars 28 for interspersing separator bars 26 with rasp bars 28 in the helical pattern as shown in FIG. 5. According to the invention as seen in the enlarged portion of rotor 20 of FIG. 6, straight separator bar 26 and rasp bar 28 are of similar axial span, denoted by arrows 27, thereby allowing straight separator bar 26 to mount on one mounting lug 18. Thus, as seen in a comparison of FIG. 3 with FIGS. 4 and 5, use of straight separator bar 26 maintains the generally helical pattern of mounting lugs 18, and movement of the mat of crop material in helical direction 11 will not be interrupted by straight separator bar 26.

Figure 6:
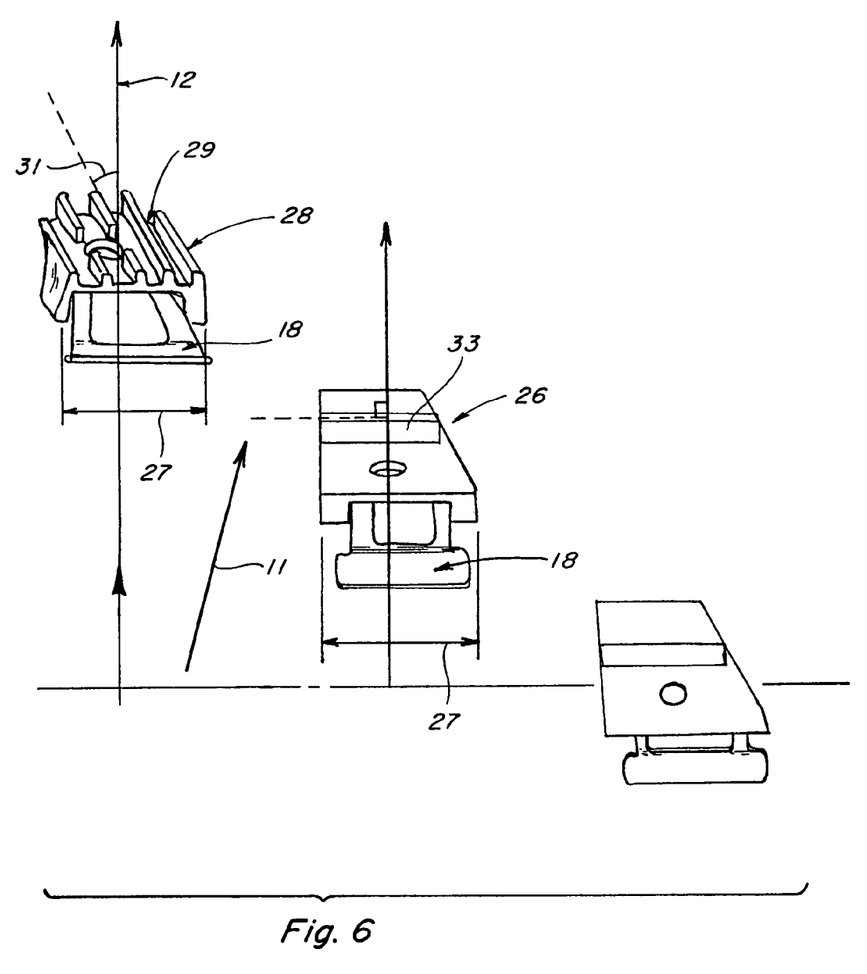
FIG. 6 is an enlarged view of a portion of the rotor of FIG. 5 showing detail of the rasp bars and straight separator bars of the invention.

With reference to FIG. 6, rasp bar 28 has grooves 29 on its radially outer surface to perform a threshing function on the mat of crop material moving thereby. Grooves 29 extend in directions generally aligned with helical direction 11 placing them at a small acute angle 31 from direction of rotation 12. Straight separator bar 26 includes at least one radially outer edge 33 extending generally transverse to helical direction 11 and/or direction of rotation 12 for performing a separating function on the mat of crop material while maintaining the generally helical pattern of mounting lugs 18 as shown generally in FIG. 5.

Figure 7:
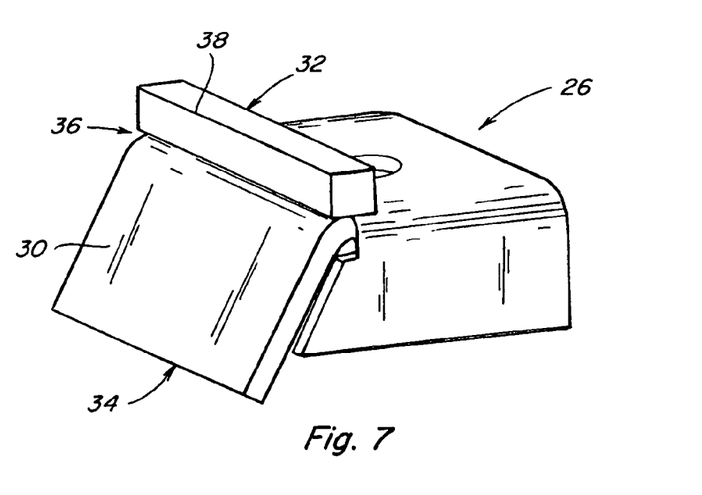
FIG. 7 is a side perspective view of the separator bar according to one embodiment of the present invention.
Figure 8:
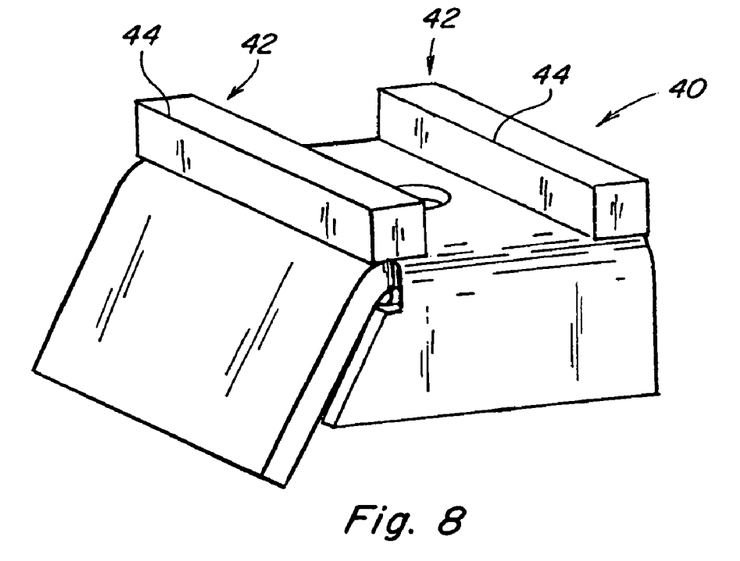
FIG. 8 is side perspective view of the separator bar according to another embodiment of the present invention.
Figure 9:
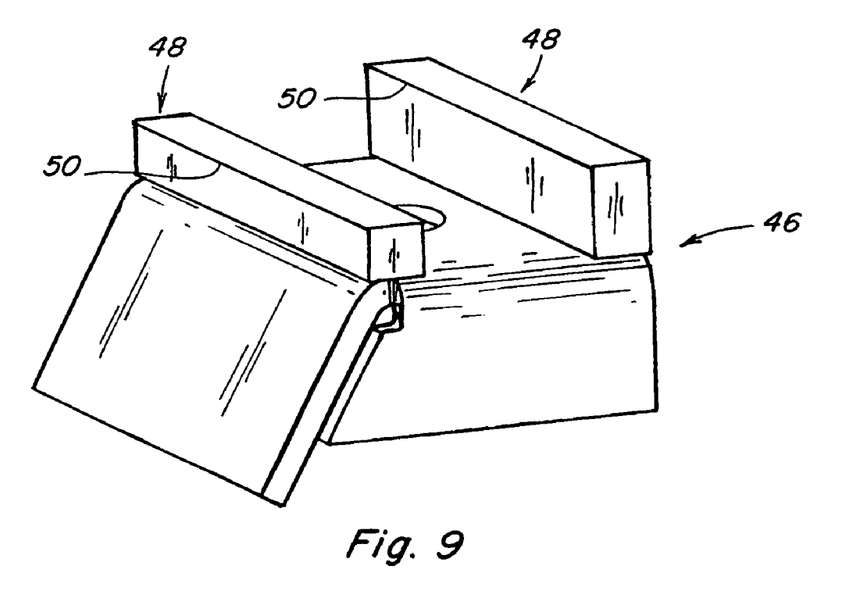
FIG. 9 is a side perspective view of the separator bar according to yet another embodiment of the present invention.

FIG. 7 is a side perspective view of separator bar 28 of the present invention. Straight separator bar 28 comprises a sloped leading edge 30 and an agitation element 32. When mounted on rotor 20, leading edge 30 engages crop material at a first end 34, guides the crop material radially outward towards a second end 36 and agitation element 32. As shown in this embodiment, agitation element 32 is rectangular in shape with at least one sharp edge 38. FIGS. 8 and 9 show alternate embodiments of the present invention. In FIG. 8 straight separator bar 40 includes two rectangular bars 42, each having at least one sharp edge 44. In FIG. 9 separator bar 46 includes two rectangular shaped bars 48 of differing heights, each having at least one sharp edge 50. It should be understood that the agitation elements shown are representative of preferred embodiments of the invention, but it is anticipated that agitation elements of any shape may be used.

Figure 10:
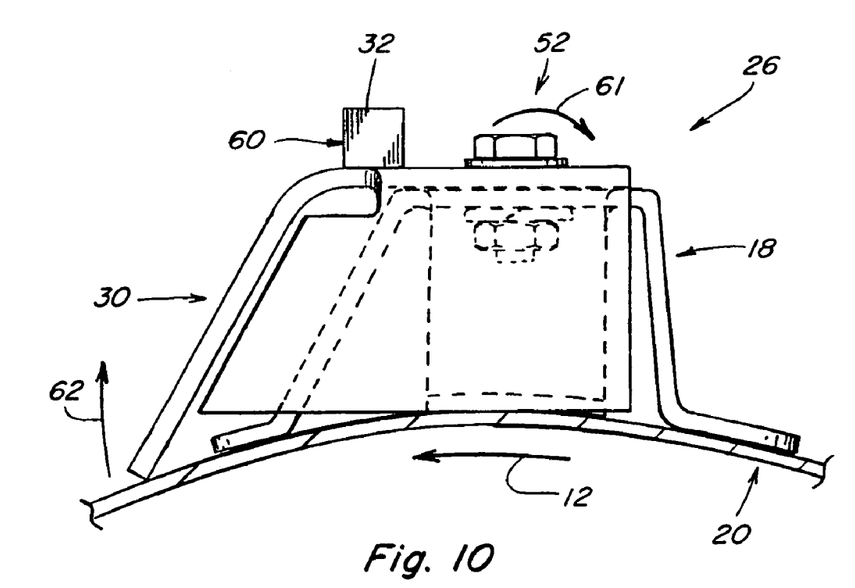
FIG. 10 is a sectional side view of the separator bar of FIG. 7 shown mounted on the mounting lug.

FIG. 10 is a side view of straight separator bar 26 shown in FIG. 7 mounted on single mounting lug 18 by a bolt 52. During a separating operation, rotor 20 rotates in direction of rotation 12, leading edge 30 of separator bar 26 engages the mat of crop material and guides it towards agitation element 32. Interaction of straight separator bar 26 and the mat of crop material results in loading conditions exerted on or near straight separator bar 26, mounting lug 18 and bolt 52. These loading conditions are summarized as a force 60 exerted against agitation element 32 and a moment 61 exerted near bolt 52 resulting in a tendency for leading edge 30 of separator bar 26 to move radially outwardly denoted by arrow 62. Reduction in axial length of the straight separator bar and eliminating its span across two adjacent mounting lugs improves loading conditions experienced at or near straight separator bar 26 increasing the longevity and the time between maintenance of separator bar attachments.

Figure 11:
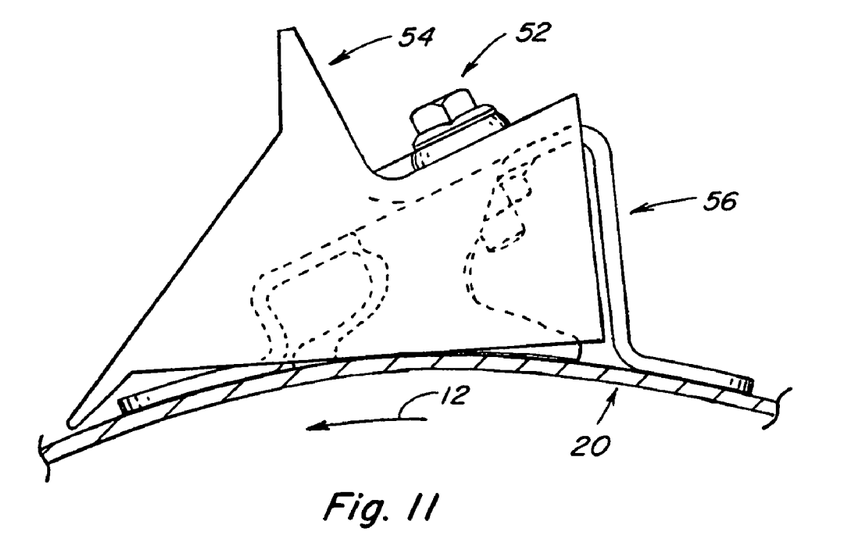
FIG. 11 is a sectional side view of an alternate embodiment of the invention shown mounted on a mounting lug.

FIG. 11 shows another embodiment of a straight separator bar 54 mounted on a single mounting lug 56 that is representative of separating elements and mounting lugs used in conjunction with threshing and separating systems having a smaller diameter rotor (not shown).

Straight separator bar 26, according to the present invention, is interchangeable with rasp bar 18 in any desired combination on rotor 20 as shown in FIG. 5. The threshing and separating capability of threshing/separating system 22 is no longer limited by predetermined numbers or placement of separator bars 14 based on available pairs of adjacent mounting lugs 16 (FIG. 3). The ability to freely intersperse separator bars 26 with rasp bars 28 allows earlier and/or additional separating capability in threshing/separating system 22. Even more importantly, this additional separating capability eliminates a typical cost associated with separation. The flow of the crop material through threshing/separating system 22 is actually improved because separator bar 26, according to the present invention, does not interrupt movement of the mat of crop material in helical direction 11.

As noted above, an advantage of the invention is the freedom to interchange threshing elements, such as rasp bars, and separating elements, such as straight separator bars, on mounting lugs welded to the rotor. Because the separator bars mount on a single mounting lug, the movement of the mat of crop material in the helical direction is no longer interrupted by the separating function. Finally, the shorter separator bar improves the loading conditions at the separator bar attachment bolt, saving cost in maintenance.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A rotor for a threshing system of an agricultural combine, comprising:
   a body supported for rotation in a direction of rotation about a rotational axis therethrough, the body having an outer circumferential surface including a plurality of mounting lugs arranged in a spaced apart generally helical pattern and defining a generally helical direction for movement of a mat of crop material therealong;
   a plurality of rasp bars mounted individually on the lugs, each rasp bar having an axial extent and a radially outer surface including grooves extending in directions generally aligned with the direction of rotation for performing a threshing function on and encouraging movement of the crop material in the helical direction; and
   a plurality of modular separator bars individually mounted on selected ones of the mounting lugs, the plurality of modular separating bars selectively interchangeable with the rasp bars, so as to be interspersed with the rasp bars whereby the helical pattern of the mounting lugs is maintained; each of the separator bars having an axial extent about equal to the axial extent of the rasp bar and including at least one radially outer edge extending generally transverse to the direction of rotation for engaging and uncoupling smaller components from the mat of crop material and maintaining movement of the mat of crop material in the generally helical direction, wherein the at least one radially outer edge includes a sloped leading edge having a first end extending radially outward towards a second end and an agitation element adjacent the second end, the separator bar oriented on the rotor for engaging the mat of crop material at the first end and guiding the mat of crop material along the leading edge towards the agitation element.

2. The rotor of claim 1, wherein the agitation element has a front edge facing in the direction of rotation that is generally rectangular in shape with at least one sharp edge.

3. The rotor of claim 1, wherein the agitation element comprises a plurality of generally rectangular elements, each rectangular element with at least one sharp edge.

4. The rotor of claim 3, wherein the plurality of generally rectangular elements have different radial extents.

5. The rotor of claim 1 comprising an inlet end adjacent a forward section having an extent of approximately one half of the rotor and a rearward section adjacent a discharge section, wherein the forward section includes multiple separator bars interspersed with the rasp bars.

6. The rotor of claim 1 having a user selectable arrangement of rasp bars and separator bars mounted thereon.

7. A rotor for a threshing system of an agricultural combine, comprising:
   a body supported for rotation in a direction of rotation about a rotational axis having an outer circumferential surface and including mounting lugs permanently affixed on the outer circumferential surface in a generally helical pattern;
   a plurality of rasp bars individually mounted on a portion of the lugs, each rasp bar having an axial extent and including grooves generally aligned at a small acute angle relative to the direction of motion for rakingly engaging a mat of crop material; and
   a plurality of separator bars individually mounted on individual mounting lugs, the plurality of separating bars selectively interchangeable with the rasp bars for interspersing the separator bars with the rasp bars whereby the helical pattern on the circumferential surface is maintained; each of the separator bars having an axial extent similar to the axial extent of the rasp bar and including at least one radially outer edge extending generally transverse to the direction of rotation for performing a separating function and allowing the mat of crop material to move in the generally helical direction, wherein the at least one radially outer edge includes a sloped leading edge having a first end extending radially outward towards a second end and an agitation element adjacent the second end, the separator bar oriented on the rotor for engaging the mat of crop material at the first end and guiding the mat of crop material along the leading edge towards the agitation element.

8. The rotor of claim 7, wherein the agitation element has a front edge facing in the direction of rotation that is generally rectangular in shape with at least one sharp edge.

9. The rotor of claim 7, wherein the agitation element comprises a plurality of generally rectangular elements, each rectangular element with at least one sharp edge.

10. The rotor of claim 9, wherein the plurality of generally rectangular elements have different radial extents.

11. The rotor of claim 7 comprising an inlet end adjacent a forward section having an extent of approximately one half of the rotor and a rearward section adjacent a discharge section, wherein the forward section includes multiple separator bars interspersed with the rasp bars.

12. The rotor of claim 7 having a user selectable number of rasp bars and separator bars mounted thereon.

* * * * *